United States Patent Office 3,755,509
Patented Aug. 28, 1973

3,755,509
PHOSPHORUS ACID ESTERS
Leslie G. Nunn, Jr., Metuchen, and Leslie M. Schenck, and Robert E. Leary, Union, N.J., assignors to GAF Corporation, New York, N.Y.
No Drawing. Filed June 1, 1970, Ser. No. 42,537
Int. Cl. C07f 9/08
U.S. Cl. 260—951                                    1 Claim

ABSTRACT OF THE DISCLOSURE

A process of neutralizing phosphate esters is described. The esters are prepared by reacting a phosphating agent with a hydroxylic organic compound. A lower alkylene oxide is added to the ester and controlled temperatures and under anhydrous conditions to achieve the desired degree of neutralization. The neutralized esters have surface active qualities.

---

The present invention relates to novel surface active compositions and their production and, more particularly, to neutral or partially neutral low ash phosphate surface active agents and a process for producing same.

It has long been known to prepare phosphate ester surface active agents by the reaction of an hydroxylic organic compound with a phosphating agent such as $P_2O_5$, $PCl_3$, $POCl_3$, polyphosphoric acid, etc. A suitable process for the production of mixed primary and secondary phosphate esters is shown in U.S. Pat. 3,004,056 wherein such materials are produced by reacting up to 4.5 moles of a hydroxylic organic non-ionic surface active agent with one mole of $P_2O_5$ under substantially anhydrous conditions at a temperature below about 110° C.

These and similar phosphate ester surface active agents have found a variety of uses in heavy-duty detergents, waterless cleaners, dry cleaning additives, emulsifiers, fuel and lubricating oil additives and in textile and lacquer finishes, etc.

In many of these and similar applications, however, it is necessary that the surface active agent be neutral or partially neutralized so as to be effective for its intended use without the adverse effect of the free hydroxyl groups. For this reason it has been customary to neutralize or partially neutralize phosphate esters and similar surface active materials by reaction with inorganic bases such as alkali or alkaline earth hydroxide solutions or a host of organic amines.

Such neutralizations, however, present serious drawbacks in the use of these surface active materials. Since residual phosphoric anhydrides, etc., are retained in the organic phosphate products, undesirable phosphorus salts are formed during neutralization and these salts may be removed only by costly physical or chemical treatment. Moreover, various utilities of these phosphate esters and similar surface active materials require that the surface active materials have an extremely low ash content. In such applications, therefore, it is extremely undesirable to neutralize the phosphate ester surface active agents with alkali or alkaline earth metals since the addition of such metals to the surface active material greatly increases the residual ash content of the neutral or partially neutralized material. For these reasons, the abovedescribed methods of neutralization of phosphate ester surface active agents have not found overwhelming acceptance and it has long been the desire of the industry to provide a simple means of producing the desired neutral or partially neutral surface active materials which is free from the drawbacks of these previously employed processes.

It has now been discovered that it is possible to produce neutral or partially neutralized phosphate esters by a simple economical process in which the mixed primary and secondary phosphate esters containing free hydroxyl groups are reacted with an alkylene oxide.

It is therefore a principal object of the present invention to provide neutral or partially neutralized phosphate ester surface active agents and a process for producing such materials which are free from the inherent deficiencies of heretofore known materials and processes.

It is yet a further object of the present invention to provide such materials and process wherein mixed primary and secondary phosphate surface active agents are neutralized or partially neutralized by reaction with an alkylene oxide.

Still further objects and advantages of the surface active agents and process of the present invention will become more apparent from the following more detailed description of the invention.

The alkylene oxide neutralizing agents that are applicable in accordance with the present invention include the unsubstituted and substituted lower alkylene oxides. Such materials include, for example, ethylene oxide, propylene oxide, butylene oxide, 1, 2 epoxy-3-chloropropane, etc. The term alkylene oxide is therefore intended to embrace both the substituted and unsubstituted materials.

The mixed primary and secondary phosphate esters that are neutralized or partially neutralized in accordance with the present invention are those that are conventionally disclosed in the prior art. A suitable process for producing such mixed phosphate esters is disclosed in U.S. Pat. 3,004,056 wherein such esters are prepared by reacting phosphorus anhydride with an hydroxylic organic compound in a mole ratio of 2.2:1 to 1:4.5.

The hydroxylic organic compounds are non-ionic surface active agents having the molecular configuration of a condensation product of at least one mole to 150 moles of ethylene, propylene, butylene oxide or a mixture thereof with a straight or branched chain aliphatic alcohol comprised of 1–22 carbon atoms or mono, di, or tri alkylated hydroxylic aromatic compounds, each alkyl containing from 1 to 22 carbon atoms. The precursor phosphates are prepared by reacting phosphoric anhydride, phosphorus oxychloride, polyphosphoric acid and the like with the above mentioned hydroxylic organic compounds under substantially anhydrous conditions at 20°–110° C.

Suitable hydroxylic organic compounds include, therefore, alkylene oxide derivatives of alcohols such as methanol, n-butanol, iso-octanol, dodecanol, tridecanol, octadecanol, docosanol, lauryl alcohol, oleyl alcohol, ricinoleyl alcohol, stearyl alcohol, etc.

Similarly, the alkylene oxide derivatives of alkylated aromatic hydroxy compounds include the ethylene, propylene, and butylene oxide derivatives of such phenolic compounds as normal and isomeric butyl, amyl, dibutyl, and diamyl phenols and cresols, tripropyl phenols and cresols, heptyl, octyl, nonyl, decyl, undecyl, dodecyl, tetradecyl, cetyl, oleyl, octadecyl and the like, phenols and cresols in addition to dihexyl- and trihexyl phenol prepared from hexene-1 and phenol, diisoheptyl-phenol, dioctyl-phenol, dinonyl-phenol, dioctyl-p-cresol, dioctyl-o-cresol, didecyl-phenol, didecyl-p-cresol, didodecyl-phenol and the like. Of particular value are the polyalkylene oxide derivatives of secondary and tertiary alkyl substituted phenols and cresols obtained by condensing olefins of the type obtained in petroleum refining with phenols or cresols. In the case of products obtained by condensing phenol or cresol with olefins of from 3 to 5 carbon atoms such as propylene, butylene or amylene, it is sometimes desirable to employ the dialkylated phenols or cresols, while in the case of compounds obtained by condensing a phenol or cresol with olefins containing 8 or more carbon atoms, the mono-substituted derivatives are sometimes preferred. Particularly desirable derivatives can be obtained from the phenols and cresols containing a substituent derived from olefins containing from 8 to 18 carbon atoms, such diisobutylene and other alkylenes as nonylene, decylene, undecylene, dodecylene pentadecylene, octadecylene and mixtures thereof, and may advantageously be the dimers and trimers obtained by polymerization of such low molecular weight olefins as propylene, butylene, isobutylene, amylene or mixtures thereof.

By the process of the present invention, it is possible to produce these organic phosphates which have a reduced acid value, i.e., a pH of about 7, and a low residual ash content without recourse to specialized equipment or manufacturing procedures.

Specifically, the present invention involves a reduction in the acid value of mixed primary and secondary phosphates and polyphosphates which have a low ash content through the addition of alkylene oxides. The following generic Formula I describes the major components of the compounds of this invention:

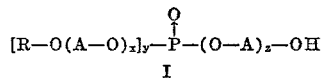

I

In the above Formula I R represents a straight or branched alkyl radical which contains from 1 to 2 carbon atoms, or mono-, di-, or trialkyl hydroxyl aromatic radicals, each alkyl containing from 1 to 22 carbon atoms either branched or straight chain or a mixture thereof substituted on a hydroxylic aromatic nucleus which contains 6 or 12 carbon atoms, A is an alkylene radical containing 2 to 4 carbon atoms, or its substituted unreactive derivative; $x$ is an integer which may vary from 1 to 150 and $y$ and $z$ are whole numbers where $y$ in at least 1, $z$ may vary from 1 to 2 and the sum of $y$ and $z$ is 3.

Generic Formula I represents the least complex organic phosphate mixture. When the organic phosphate is prepared with phosphoric anhydride or polyphosphoric acid and especially when the molar ratio of phosphoric anhydride or polyphosphoric acid to non-ionic surface active agent is high (i.e., about 2.2-1) mixed polyphosphates are formed. This fact was recognized in U.S. 2,742,379. Experimental data shows that phosphoric anhydride exists as a cyclic dimer consisting of $P_4O_{10}$ units, however, as illustrated by Formula II.

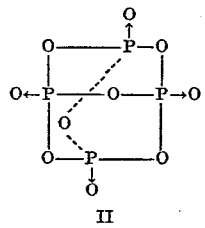

II

Therefore, in the addition of one mole of hydroxylic surface agent R—O—(A—O)$_x$—, previously defined, to 2.2 moles of phosphoric anhydride produces a compound which contains one mole of free acidic hydrogen atoms capable of accepting one mole of alkylene oxide as shown by Formula III.

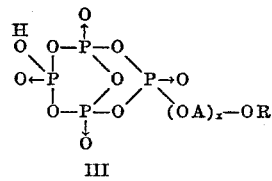

III

It is evident, therefore, that there exists a whole spectrum of discrete compounds intermediate between III, the least possible organic substituted phosphate and I, the most highly organic substituted phosphate, any or all of which contain at least one or more free acidic hydrogen atoms capable of reacting with an alkylene oxide. The formation of polyphosphates is found to be most prevalent when phosphoric anhydride or polyphosphoric acid is used to prepare the phosphate mixture and least prevalent when phosphorous oxychloride or phosphoric acid is employed as the phosphating agent.

The neutral or partially neutralized phosphate esters of the present invention are prepared by adding an alkylene oxide in an amount sufficient to achieve the desired degree of neutralization to the organic phosphate system at a temperature of from about 25° C. to about 140° C. in an anhydrous system. The amount of alkylene oxide, as stated, can range from a very minor amount stoichiometrically where only a slight increase in the pH of the system is desired to a molar excess when a neutral or substantially neutral material is desired. When a substantially neutral or neutral product is desired, it is preferable to add a 5% to 40% molar excess of alkylene oxide after the theoretical amount necessary to neutralize a pure primary ester has been added to the system. In such case, the system is preferably held, under the conditions described above, for an additional period of time, i.e., about 1 hour to 14 hours to assure complete neutralization.

In all cases, the residual ash content of the neutralized phosphate esters is not materially increased by the process of the present invention since no metal, alkali or alkaline earth, is added to the system. After the desired degree of acidity is obtained, excess alkylene oxide can be easily removed from the system by distillation. The reaction requires no catalyst since the acidic nature of the mixed organic phosphates autocatalyzes the condensation with alkylene oxides. When all acidic hydrogens have been saturated with alkylene oxide, the reaction ceases (neutral point) although any pH between 7 and that of the starting organic phosphate may be obtained. Thus, if it were desired to produce an organic phosphate with a given pH, for example, pH=4, alkylene oxide is added until the pH of the aqueous solution of a sample aliquot has a pH of 4.

In addition to providing a neutralized or partially neutralized organic phosphate with a low ash content, the reaction of an alkylene oxide with organic phosphates provides an additional advantage since the hydrophilic-hydrophobic nature of the organic phosphate may be altered by the choice of alkylene oxide employed. If a more hydrophobic product is desired, a higher alkylene oxide as butylene oxide is used, while a more hydrophilic product may be obtained through the addition of ethylene oxide.

The following examples illustrate various embodiments of the present invention. It is to be understood that such examples are for illustrative purposes only and the invention is in no way to be deemed as limited thereto.

In all of the following examples, the phosphate ester surface active agents are produced by the procedure described in U.S. Pat. 3,004,056. In each example, accompanying description of the phosphate, the phosphating agent and the molar ratio of phosphating agent to non-ionic surface active agent is listed—i.e. ($P_2O_5$-3-1) indicates $P_2O_5$ was used to prepare the phosphate and a molar ratio of 3 moles of non-ionic surface active agent was used per one unit of $P_2O_5$.

EXAMPLE I

Into a 500 ml. 4-neck flask equipped with an agitator, reflux condenser, thermometer and dropping funnel were charged 137 parts by weight of nonylphenoxynonaethoxy phosphate ($P_2O_5$-2.7:1). The acidic phosphate was heated to 120–130° C. and reacted wtih 25.6 parts by weight of butylene oxide. The product showed 85.0% triester which contained 2.28% phosphorus (2.47% was theoretical). The original phosphate analyzed 3.3% non-ionic.

The pH of a 10% aqueous solution increased from the original 2.1 to 2.8, indicating that neutralization was partially complete.

The product gave the following Ross-Miles foam data measured as a 0.1% solution: Initial, 103 cc. After 5 minutes, 93 cc.

EXAMPLE II

Example I was repeated except that 167 parts by weight of dinonylphenol decaethoxy phosphate ($P_2O_5$-2.7:1) were substituted for the given phosphate.

Some 24.5 parts by weight of butylene oxide were absorbed and the final product analyzed 84.8% triester which contained 1.81% phosphorus. The starting phosphate contained 1.97% non-ionic and the pH measured as a 10% aqueous-isopropanol solution increased from 2.1 to 2.5.

EXAMPLE III

In a manner similar to Example I, 164 g. of tridecyl alcohol hexaethoxyphosphate ($P_2O_5$-2.7:1) were reacted with 31.3 g. of ethylene oxide at 105° C. under 1–1.5 atmospheres pressure. An aqueous solution of the final product has a pH=6.8. The original pH was 2.4.

EXAMPLE IV

In a manner similar to Example I, 320 g. of dodecylphenol+1.8 ethylene oxide (E.O. phosphate ($P_2O_5$-.7-1) were reacted with 68.8 g. of ethylene oxide. The pH increased from 1.9 to 6 (10% aqueous solution) indicating almost complete neutralization of the acidic phosphate. The product contained 78.6% neutral material which analyzed 1.90% phosphorus.

EXAMPLE V

In a manner similar to Example I, 243 parts by weight dodecylphenol+1.8 E.O. phosphate ($P_2O_5$-2.7-1) were reacted with 88.3 parts by weight of 1,2 epoxy-3-chloropropane.

Ross Miles foam data measured as a 0.1% solution were as follows: Initial, 5 cc. After 5 minutes, 3 cc.

EXAMPLE VI

The procedure of Example I was repeated by reacting 241.5 g. dodecoxy tetraethoxy phosphate ($P_2O_5$-2.5-1) and 92. g. of 1,2 epoxy-3-chloropropane. After the alkylene oxide was consumed, the pH measured as a 10% aqueous solution increased from 2.1 to 6.8. The product contained 73% of non-acidic material analyzing 3.73% phosphorus.

EXAMPLE VII

In a manner similar to Example I, 274 parts by weight of nonylphenoxynonaethoxy phosphate ($P_2O_5$-2.7-1) were reacted with 52 parts by weight of 1,2 epoxy-3-chloropropane. The pH of an aqueous isopropanol solution increased from 2.65 to 5.0 and the product contained 80.2% neutral triester which analyzed 2.10% phosphorus.

EXAMPLE VIII

In a manner similar to Example I, 164 parts by weight of tridecylalcohol hexaethoxy phosphate ($P_2O_5$-2.7-1) were reacted wtih 57 parts by weight of 1,2 epoxy-3-chloropropane. The pH (10% aqueous-isopropanol solution) of the product was increased from 2 to 6.8. The product contained 70.2% neutral material which analyzed 3.30% phosphorus.

EXAMPLE IX

To 402 g. (0.70 mole) of the dried 7 mole ethylene oxide adduct of oleyl alcohol were added 52 g. (0.34 mole) of phosphorus oxychloride at 35° C. The reaction mixture was heated to 75° C. and bubbled for 2 hours with nitrogen to remove hydrogen chloride. Water, 6.5 g., was added to convert the oleyl ethyleneoxy chlorophosphate to the corresponding phosphoric acid. The acid was bubbled with nitrogen for 2 hours at 100° C. to remove water and hydrogen chloride. The pH of a 10% isopropanol-water solution of product was 1.8.

A 200 g. (0.16 mole) sample of the above phosphoric acid ($POCl_3$-2:1) was reacted with 23.8 g. (0.33 mole) of butylene oxide in a manner similar to Example I. The pH of a 10% aqueous isopropanol solution of the resulting alkoxylate was 4.2.

EXAMPLE X

A 297 parts by weight sample of n-docosanol pentaethoxy phosphate ($P_2O_5$-3-1) was reacted with 48.5 parts by weight of ethylene oxide at 100° C. according to Example III. The resulting yellow oil had a pH=6.2 measured as a 10% aqueous-isopropanol solution.

EXAMPLE XI

In a manner similar to Example III, 694 parts by weight of the phosphate ($P_2O_5$-1-2.2) of the 150 mole ethylene oxide adduct of methanol were treated with 11 parts by weight of ethylene oxide. The resulting phosphate-polyphosphate mixture had a pH=4.7 measured as a 10% aqueous solution.

EXAMPLE XII

The procedure of Example III was repeated by reacting 52 g. ethylene oxide with 460 g. of the phosphate of tri-t-butylphenol triethoxylate ($P_2O_5$-4.25-1). The neutral phosphate mixture consisted primarily of a product of the following structure:

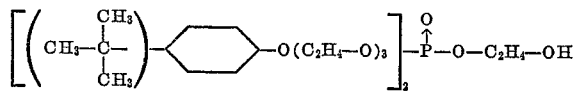

EXAMPLE XIII

Butylnaphthoxy pentaethoxy phosphate, 300 parts by weight, ($P_2O5$-3-1) was reacted with 115 parts by weight of 1,2-epoxy-3-chloropropane according to the procedure described in Example I. The resulting ethoxylate had a pH=3.6 measured as a 10% isopropanol-water solution.

EXAMPLE XIV

The reaction of 217 parts by weight phenoxyethanol phosphate ($P_2O_5$-4-1) and 70 parts by weight of propylene oxide was conducted as described in Example III. A mixed phosphate was obtained comprising mainly a compound having the following structure:

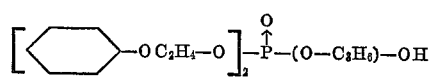

EXAMPLE XV

Nonylphenol hexaethoxy phosphate, 516 parts by weight (Polyphosphoric Acid-3-1) was reacted with 40 parts by weight of ethylene oxide according to the procedure of Example III. The mixed phosphate-polyphosphate had a pH of 5.1 when measured as a 10% aqueous-isopropanol solution.

EXAMPLE XVI

Example I was repeated except that 149 parts by weight nonylphenoxytetraethoxy tridecyloxy octaethoxy phosphate ($P_2O_5$-3-1) were substituted for nonylphenoxy nonaethoxy phosphate. The resulting product mixture comprised primarily of the following neutral phosphate:

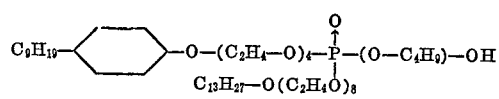

EXAMPLE XVII

The phosphate of octylphenol hexaethoxylate ($P_2O_5$-4-1)

264 parts by weight, was substituted for 137 parts by weight of nonylphenoxy nonaethoxy phosphate and reacted with 256 parts by weight of butylene oxide according to Example I. A 10% solution of the resulting product in water-isopropanol had a pH=5.

EXAMPLE XVIII

Similar to the conditions described in Example I, 260 parts by weight of the phosphate of cresol alkoxylated with 5 moles of propylene oxide and 4 moles of ethylene oxide ($P_2O_5$-2-1) were reacted with 87.5 parts by weight 1,2-epoxy-3-chloropropane. The resulting product comprised primarily a neutral substance having the following structure:

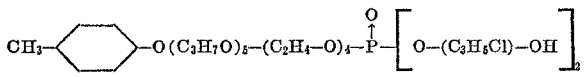

EXAMPLE XIX

The phosphate ($P_2O_5$-4-1) of dibutyl cresol condensed with 4 moles of butylene oxide and 4 moles of ethylene oxide, 361 parts by weight, was reacted with 48.4 parts by weight of ethylene oxide as described in Example III. The major portion of the phosphate mixture was a neutral product represented by the following structuural formula:

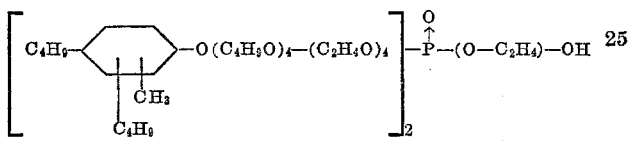

EXAMPLE XX

Into a stainless steeel autoclave equipped with heater and agitator were charged 250 g. tridecyl alcohol +6 hexaethoxy phosphate and the phosphate was heated to 90° C. Ethylene oxide 54 g., was added over about 30 minutes at 90° C. and 40 p.s.i.g. No further consumption of ethylene oxide was observed. The temperature was increased to 150° C. but no more ethylene oxide was consumed. The product had a pH=6.8. Caustic powder, 2 g., was added to the cooled alkoxylate and the temperature was elevated to 140° C. under 40 p.s.i.g. of ethylene oxide. After two hours under these conditions, no ethylene oxide was consumed.

While certain preferred embodiments have been illustrated by way of specific examples, it is to be understood that the invention is in no way to be deemed as limited thereto but should be construed as broadly as all or any equivalents thereof.

We claim:
1. The neutral or substantially neutral phosphate esters having the formula

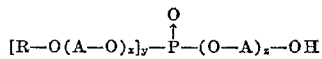

wherein R represents a straight or branched alkyl radical containing from 1 to 22 carbon atoms, or mono-, di-, or trialkyl hydroxyl aromatic radicals, each alkyl containing from 1 to 22 carbon atoms either branched or straight chain or a mixture thereof substituted on a hydroxylic aromatic nucleus containing 6 or 12 carbon atoms, A is an alkylene radical containing 2 to 4 carbon atoms, $x$ is an integer which may vary from 1 to 150 and $y$ and $z$ are each 1 or 2 and the sum of $y$ and $z$ is 3.

References Cited
UNITED STATES PATENTS

| | | | |
|---|---|---|---|
| 3,004,056 | 10/1961 | Nunn et al. | 260—950 |
| 3,251,828 | 5/1966 | Lutz | 260—987 UX |
| 3,442,986 | 5/1969 | Mole et al. | 260—978 X |
| 3,309,427 | 3/1967 | Zech et al. | 260—978 X |

LEWIS GOTTS, Primary Examiner

R. L. RAYMOND, Assistant Examiner

U.S. Cl. X.R.

252—49.9, 137, 152; 260—950, 978, 987